Oct. 8, 1929.  J. J. SWAN  1,730,984
EMBOSSING MACHINE
Filed Nov. 16, 1927   2 Sheets-Sheet 2
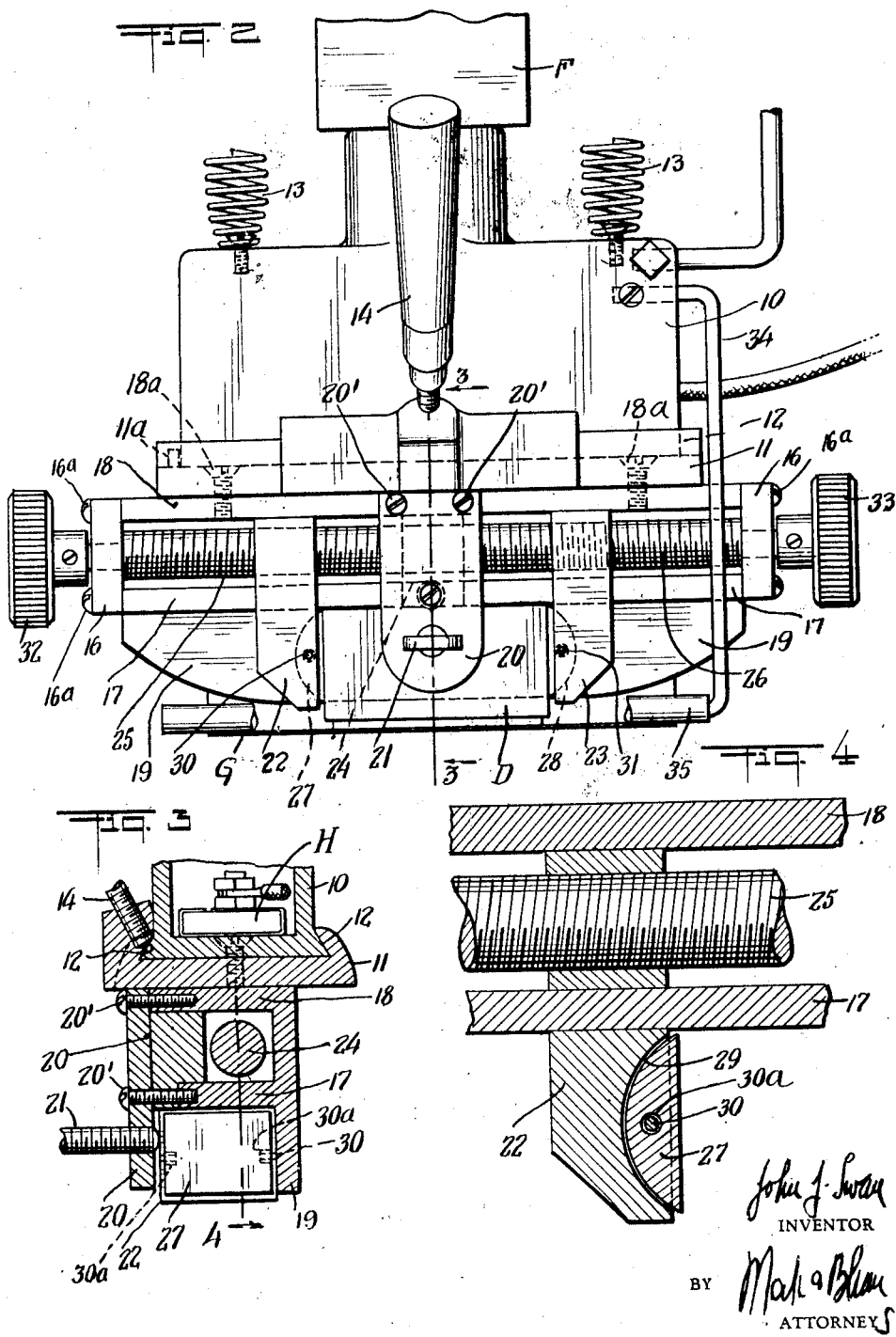

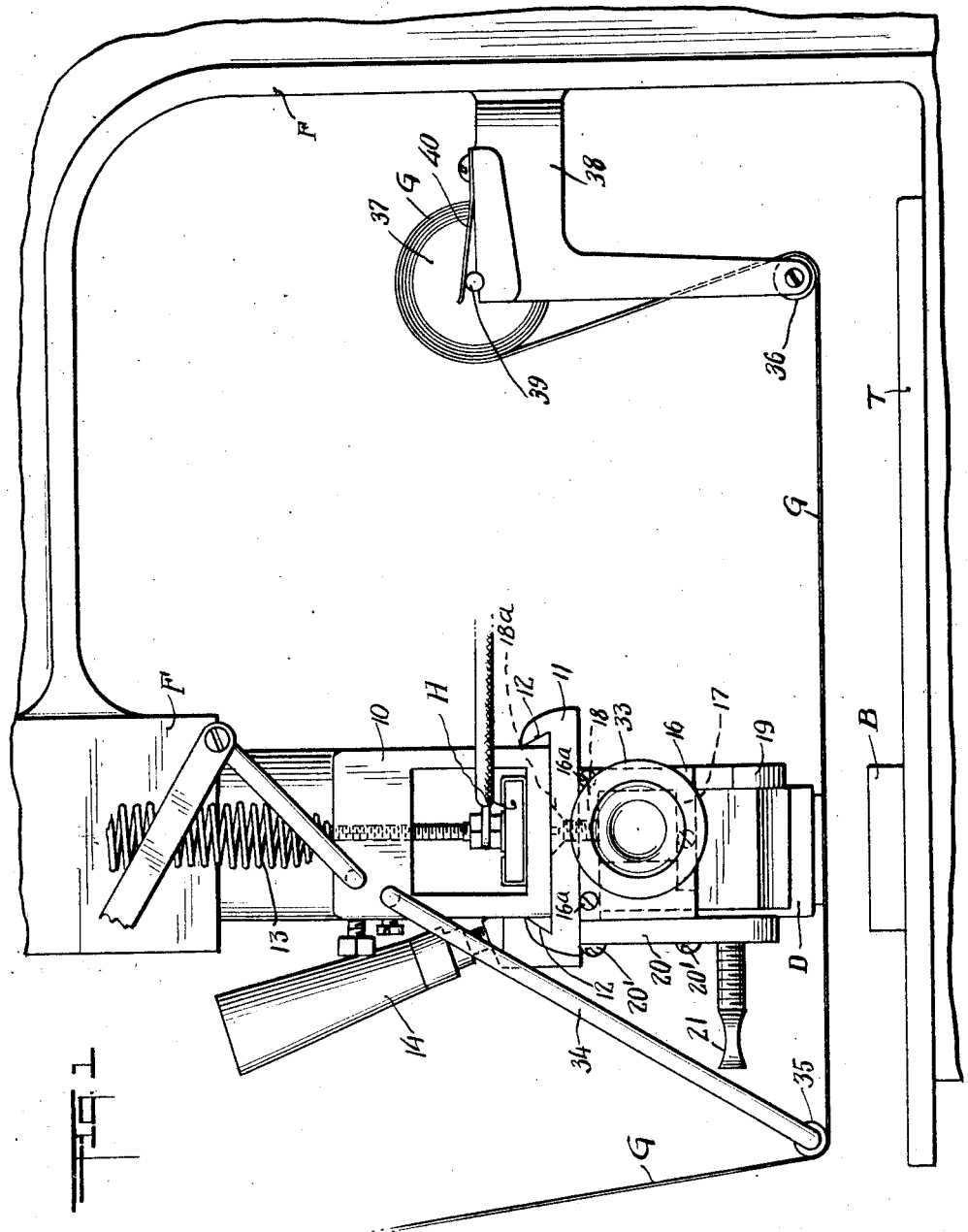

Patented Oct. 8, 1929

1,730,984

UNITED STATES PATENT OFFICE

JOHN J. SWAN, OF MONTCLAIR, NEW JERSEY, ASSIGNOR TO SIMPLEX GOLD STAMP-
ING PRESS CO. INC., OF NEW YORK, N. Y., A CORPORATION OF NEW YORK

EMBOSSING MACHINE

Application filed November 16, 1927. Serial No. 233,679.

This invention relates to improvements in an embossing machine. However, the invention extends to any machine used for stamping, or for performing any type of printing operation in which a heated impression or printing surface is employed.

One of the objects of my invention is to devise an improved holder for the die of an embossing machine.

Another object of this invention is to provide automatically adjustable holding means for the embossing die whereby the bottom of the embossing die is always held in proper position with respect to the work.

Another object of the invention is to provide an improved combination of the heater and the holder for the die of an embossing machine.

Other objects of the invention will be set forth in the following specification and drawings which illustrate a preferred embodiment thereof, it being understood that the above general statement of the objects of this invention is intended to generally explain the same and without limiting it in any manner.

Fig. 1 is a side elevation.

Fig. 2 is a front elevation.

Fig. 3 is a section on 3—3 of Fig. 2.

Fig. 4 is an enlarged detail section on the line 4—4 of Fig. 3.

A machine is provided with a base made of any suitable metal and having an upstanding angular frame arm F. The object to be stamped or embossed, is placed on a slidable table T. The movable head 10 of the embossing machine, which is of any suitable type, is supported upon two springs 13 which tend to keep it in the normal position shown in Fig. 1. The handle 14 is provided for depressing the head 10.

As shown in Fig. 3 the threaded end of the handle 14 is not directly connected to the head 10, said threaded end 14 being connected to the slide 11 which moves vertically in unison with the head 10. The head 10 is provided with a lower and outwardly tapered end 12, upon which the slide 11 is mounted. The slide 11 is provided with a stop pin 11ª which limits its horizontal sliding movement upon the head 10. The threaded end of member 14 clamps against head 10, as shown in Fig. 3 and this maintains slide 11 in position.

As shown in Fig. 3 the head 10 is hollow and it is provided with an electric heater H of any suitable type. This heater heats the head 10, the slide 11, members 18 and 19 and the embossing die D. One of the improvements in the present invention consists in having the heat transmitted from the heater H to the die D, by means of direct conduction through snugly contacting metal parts. The transmission of the heat thus secured is much superior than when the heat must pass over air spaces or the like.

The die support 19 is provided with horizontal and forwardly projecting plates 18 and 17 which are parallel to each other. The plate 18 is connected to the slide 11 by means of countersunk screws 18ª, and a front plate 20 is connected to the plates 17 and 18 by means of the screws 20'. A clamping screw 21 passes through the front member 20 and the end of said clamping screw 21 bears against the front of the die D as shown in Fig. 3 for example. The bottom screw 20' also holds a metal block B' in position.

The jaws 22 and 23 have adjacent surfaces which are provided with concave recesses 28 and 29. Clamping members 27 are loosely mounted in the said recesses 28 and 29 so that each of said clamping members can be shifted. This freedom of movement of the clamping members permits them to automatically move into proper position for full clamping engagement with the adjacent faces of the embossing die D. The inner and outer ends of the jaws 22 and 23 are provided with retaining pins 30 and 31 at the opposite faces of the said recesses, and these retaining pins 30 and 31 fit loosely in recesses 30ª formed in the ends of the clamping members 27. The adjacent operative faces of the bearing members project slightly in front of their respective jaws 22 and 23. These adjustable clamping members compensate for any irregularities in the manufacture of the parts and they also compensate for any distortion which is caused by the bending of the bottom ends of said jaws when a die is clamped between them. The clamping screw 21 clamps the die D against the member 19.

The jaws 22 and 23 are slotted so that they are slidably mounted upon the plate 17. They have upper internally threaded openings which cooperate with the oppositely directed threads 25 and 26 of the screw 24. The screw 24 is mounted in bearings 16 which are connected to the plates 18 and 17 by means of the screws 16$^a$. Likewise said screw 24 is provided with external operating heads 32 and 33.

When the screw 24 is turned, the jaws 22 and 23 are slid in opposite directions. If said jaws are moved towards each other, their respective clamping members 27 engage the adjacent faces of the die D so that it is firmly clamped in position while the bottom face thereof remains perfectly horizontal and the top face of said die is in firm contact with the adjacent underface of plate 17.

Experience has shown that if the lateral faces of the die D are planar and the adjacent faces of the jaws 22 and 23 are fixed and planar, that the die D is usually clamped in position so that the bottom thereof is not truly horizontal. This not only mars the clearness of the work but lowers the efficiency of the heating element H because of the absence of metal to metal contact between the jaws and the entire lateral faces of the die.

However, according to the present invention the heat is directly transmitted by metallic conduction to the jaws 22 and 23, whose upper faces fit snugly against the bottom of the plate 18, so that large heating efficiency of the die D is secured.

The device is provided with a roller 37 bearing a roll of imprinting foil G. The roller 37 is provided with a shaft 39 which is held in place on the bearing 38 by means of adjustable springs 40. The imprinting foil G is passed under the roller 36 and under the rubber-covered adjusting rod 35 in the well known manner. The adjusting rod 35 is mounted at the end of arm 34 which is of the well known type.

Since the clamping members 27 are loosely mounted on their respective pins 30 and 31, their convex surfaces can be forced into firm and complete contact with the walls of the recesses 28 and 29. This secures maximum direct metal-to-metal heat conduction and also relieves the pins 30 and 31 from all stress incident to the clamping operation.

A preferred embodiment of the invention has been described, but it is clear that numerous changes and omissions could be made without departing from its spirit.

I claim:

1. In a device of the type specified, the combination of a vertically movable head, a heater associated with the said head and adapted to heat the bottom face thereof, a jaw support connected to the bottom of the said head, said jaw support having two forwardly projecting plates, a front plate connected to the said projecting plates, a pair of jaws slidably mounted upon the lower of said projecting plates, the tops of said jaws contacting with the underside of the top one of said projecting plates, and means adapted to move said jaws in opposite directions, said jaws having concave recesses in their adjacent faces.

2. In a device of the type specified, the combination of a die support having an upper plate and a lower plate, a pair of jaws having openings through which said lower plate passes so that said jaws are slidably mounted on said lower plate, the upper faces of said jaws slidably contacting with the underside of said upper plate, and means adapted to simultaneously actuate said jaws in opposite directions, said jaws having their adjacent faces provided with recesses in which relatively movable clamping members are mounted, said clamping members being adapted to clamp a die between them.

3. In a device of the type specified, the combination of a vertically movable head, and a jaw slidably mounted on said head, said jaw having a recess in one face thereof, a clamping member located in said recess and loosely connected to said jaw by connecting means adapted to permit said clamping member to move relatively to said jaw, said clamping member having sufficient freedom of movement so that the inner face thereof can firmly contact with the adjacent wall of the recess.

4. In a device of the type specified, the combination of a vertically movable head having a heater associated therewith, a jaw slidably mounted on said head, said jaw having a recess in the outer face thereof, a clamping member located in said recess, and a pin on which said clamping member is mounted, said pin extending into bearing recesses located in the opposite walls of said first-mentioned recess, said bearing recesses being of greater diameter than said pin, so that said pin can shift in its bearing recesses.

5. In a device of the type specified, the combination of a vertically movable head having a heater associated therewith, a jaw slidably mounted on said head, said jaw having a recess in the outer face thereof, a clamping member located in said recess, and a pin on which said clamping member is mounted, said pin extending into bearing recesses located in the opposite walls of said first-mentioned recess, said bearing recesses being of greater diameter than said pin, so that said pin can shift in its bearing recesses, the inner wall of said clamping member having a curved contour corresponding to the contour of the adjacent wall of said first-mentioned recess, so that said walls can contact with each other.

6. In a device of the type specified, the combination of a vertically movable head having a heater associated therewith, a jaw slidably mounted on said head, said jaw having a recess in the outer face thereof, said recess having an inner concave wall, and a clamping member mounted in said recess and adapted to shift with respect to said jaw, said clamping member having an inner convex face corresponding in contour to said inner concave wall, so that said concave wall and said convex face can contact with each other when said jaw clamping member is in operative position.

In testimony whereof I affix my signature.

JOHN J. SWAN.